(12) United States Patent
Verma et al.

(10) Patent No.: US 9,756,123 B2
(45) Date of Patent: Sep. 5, 2017

(54) GROUP OWNER RENEGOTIATION IN A WIRELESS NETWORK

(71) Applicant: Peraso Technologies, Inc., Toronto (CA)

(72) Inventors: Lochan Verma, Toronto (CA); Bradley R. Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 339 days.

(21) Appl. No.: 14/642,262

(22) Filed: Mar. 9, 2015

(65) Prior Publication Data

US 2015/0180970 A1 Jun. 25, 2015

Related U.S. Application Data

(63) Continuation of application No. 13/623,228, filed on Sep. 20, 2012, now Pat. No. 9,007,959.

(51) Int. Cl.
| | |
|---|---|
| *H04L 29/08* | (2006.01) |
| *H04W 84/20* | (2009.01) |
| *H04W 8/18* | (2009.01) |
| *H04W 28/16* | (2009.01) |
| *H04W 72/12* | (2009.01) |

(52) U.S. Cl.
CPC ......... *H04L 67/1051* (2013.01); *H04W 8/186* (2013.01); *H04W 28/16* (2013.01); *H04W 84/20* (2013.01); *H04W 72/1278* (2013.01)

(58) Field of Classification Search
None
See application file for complete search history.

(56) References Cited

U.S. PATENT DOCUMENTS

| | | | |
|---|---|---|---|
| 8,761,140 B2 * | 6/2014 | Yang | H04W 4/203 370/338 |
| 2011/0026504 A1 * | 2/2011 | Feinberg | H04W 4/08 370/338 |

(Continued)

OTHER PUBLICATIONS

"WiGig White Paper: Defining the Future of Multi-Gigabit Wireless Communications", Wireless Gigabit Alliance, Jul. 1, 2010, 5 pages.

(Continued)

*Primary Examiner* — Anh Ngoc Nguyen

(57) ABSTRACT

A method and apparatus for group owner (GO) renegotiation are provided. For example, the method and apparatus may be used for GO renegotiation in a wireless personal network (WPAN), for example, a 60-gigahertz (60 GHz) peer-to-peer (P2P) wireless network. The incumbent group owner (e.g., personal base station set (PBSS) control point (PCP)) controls the operation of the group. GO renegotiation can occur, for example, when a newly arriving device (e.g., a prospective group owner) is trying to connect to the PBSS and/or, for example, with PCP rearrangement among members of an existing group. As an example, after the formation of the group, the PCP may want to relinquish the role of being the PCP. A procedure is described for deciding among clients and the PCP which device will assume the role of group owner from the existing PCP in the event the role of group owner is to be reassigned.

20 Claims, 17 Drawing Sheets

(56) References Cited

U.S. PATENT DOCUMENTS

| | | | |
|---|---|---|---|
| 2011/0082905 A1* | 4/2011 | Wentink | H04W 84/20 709/205 |
| 2011/0093536 A1 | 4/2011 | Wentink | |
| 2012/0278389 A1* | 11/2012 | Thangadorai | H04W 84/20 709/204 |
| 2013/0039358 A1 | 2/2013 | Ejima | |
| 2013/0045678 A1 | 2/2013 | Lee | |

OTHER PUBLICATIONS

"Wi-Fi Certified Wi-Fi Direct: Personal, Portable Wi-Fi Technology", Wi-Fi Alliance, Oct. 1, 2010, 14 pages.
U.S. Appl. No. 13/623,228, filed Sep. 20, 2012, entitled "Group Owner Renegotiation in a Wireless Network".

* cited by examiner

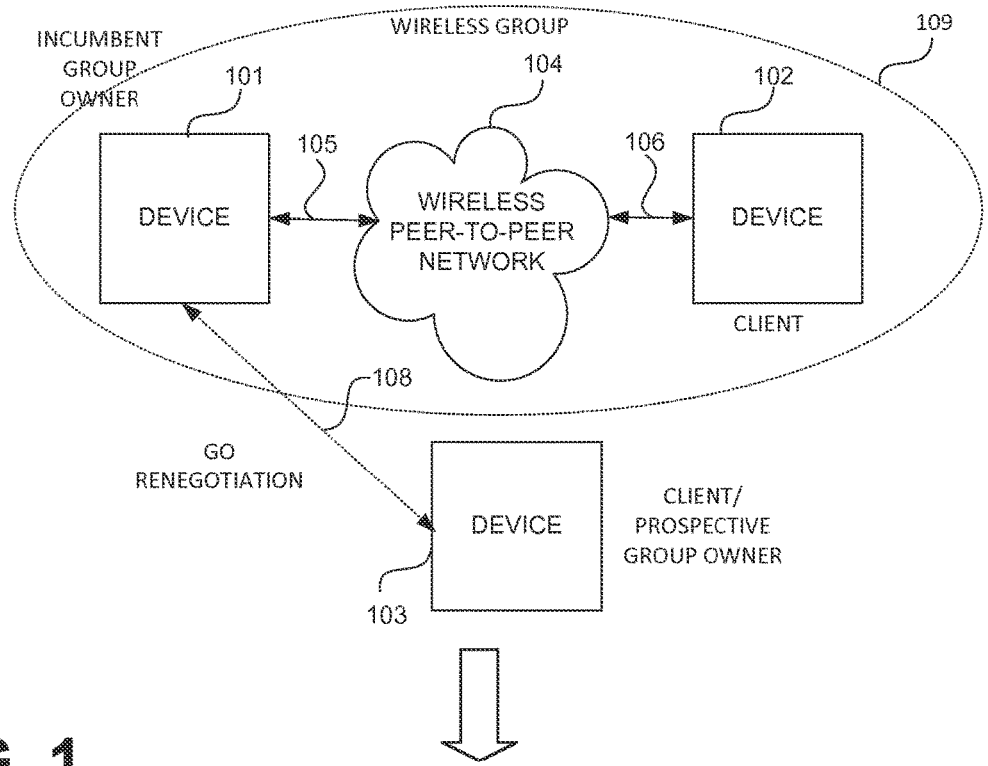
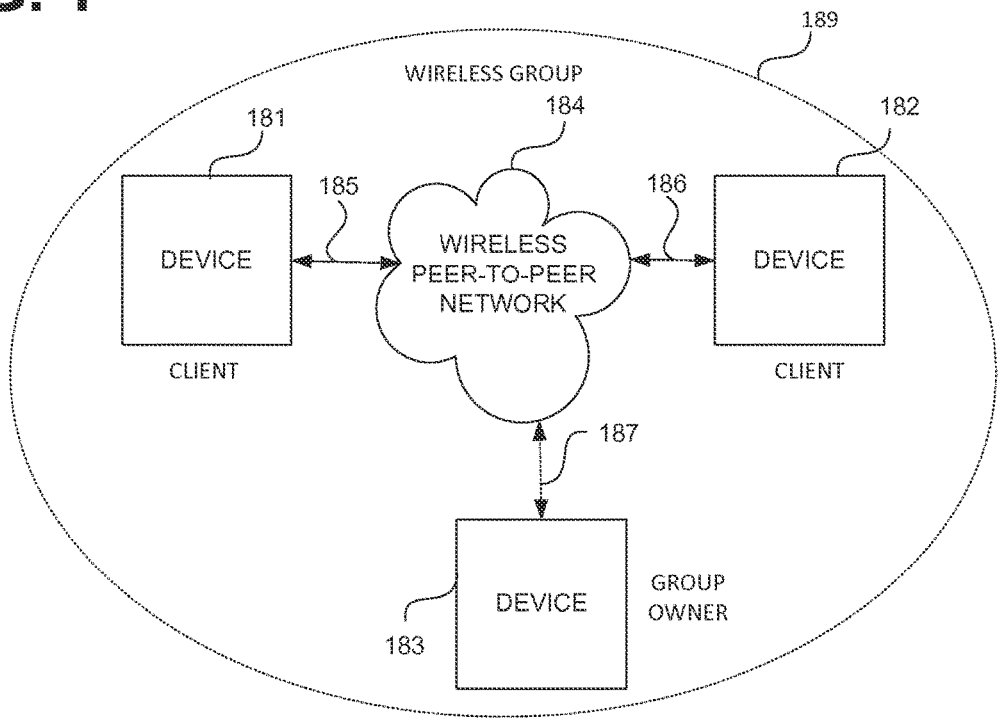
FIG. 1

| ACTION FIELD VALUE | MEANING |
|---|---|
| 0 | POWER SAVE CONFIGURATION REQUEST |
| 1 | POWER SAVE CONFIGURATION RESPONSE |
| 2 | INFORMATION REQUEST |
| 3 | INFORMATION RESPONSE |
| 4 | HANDOVER REQUEST |
| 5 | HANDOVER RESPONSE |
| 6 | DTP REQUEST |
| 7 | DTP RESPONSE |
| 8 | HANDOFF REQUEST |
| 9 | HANDOFF RESPONSE |
| 10 | INTENTION/CAPACITY REQUEST |
| 11 | INTENTION/CAPACITY RESPONSE |
| 12 | HANDOFF CONFIRMATION |

FIG. 5

| FIELD | LENGTH (BYTES) | DESCRIPTION |
|---|---|---|
| CATEGORY | 1 | SET TO INDICATE DBAND FRAME |
| ACTION | 2 | SET TO INDICATE THE ACTION FRAME TYPE |
| DIALOG TOKEN | 1 | VALUE CHOSEN TO UNIQUELY IDENTIFY TRANSACTION |
| DBAND PCP/AP CAPABILITY IE | 2 | DBAND PCP/AP CAPABILITY IE |

FIG. 8

| FIELD | LENGTH (BYTES) | DESCRIPTION |
|---|---|---|
| CATEGORY | 1 | SET TO INDICATE DBAND FRAME |
| ACTION | 2 | SET TO INDICATE THE ACTION FRAME TYPE |
| DIALOG TOKEN | 1 | VALUE CHOSEN TO UNIQUELY IDENTIFY TRANSACTION |
| STATUS | 1 | INDICATES THE DECISION OF PCP |

FIG. 9

| FIELD | LENGTH (BYTES) | DESCRIPTION |
|---|---|---|
| CATEGORY | 1 | SET TO INDICATE DBAND FRAME |
| ACTION | 2 | SET TO INDICATE THE ACTION FRAME TYPE |
| DIALOG TOKEN | 1 | VALUE CHOSEN TO UNIQUELY IDENTIFY TRANSACTION |

FIG. 10

| FIELD | LENGTH (BYTES) | DESCRIPTION |
|---|---|---|
| CATEGORY | 1 | SET TO INDICATE DBAND FRAME |
| ACTION | 2 | SET TO INDICATE THE ACTION FRAME TYPE |
| DIALOG TOKEN | 1 | VALUE CHOSEN TO UNIQUELY IDENTIFY TRANSACTION |
| DBAND PCP/AP CAPABILITY IE | 2 | DBAND PCP/AP CAPABILITY IE |

FIG. 11

| FIELD OR INFORMATION ELEMENT | LENGTH (BYTES) | DESCRIPTION |
|---|---|---|
| CATEGORY | 1 | SET TO INDICATE DBAND FRAME |
| ACTION | 2 | SET TO INDICATE THE ACTION FRAME TYPE |
| DIALOG TOKEN | 1 | VALUE CHOSEN TO UNIQUELY IDENTIFY TRANSACTION |
| NEW PCP MAC ADDRESS | 6 | MAC ADDRESS OF THE NEW PCP |
| SSID | 0-32 | SSID OF THE NETWORK |
| NEXT TBTT | 2 | TIME OFFSET IN MICROSECONDS FROM THE PREVIOUS BEACON TRANSMISSION. AT NEXT TBTT A BEACON IS TRANSMITTED |
| GROUP MEMBER LIST | n | GROUP MEMBER LIST OF THE NETWORK |
| EXTENDED SCHEDULE ELEMENT | N | SCHEDULE INFORMATION OF THE NETWORK |
| VENDOR SPECIFIC ELEMENT | m | VENDOR SPECIFIC ELEMENT |

FIG. 12

| RESERVED (SET TO 0) 1461 | MAX ASSOCIATED STA NUMBER 1454 | TOTAL NUMBER OF SECTORS 1463 | PSEUDO-STATIC ALLOCATIONS 1452 | TDDTT 1451 | DECENTRALIZED PCP/AP CLUSTERING 1456 | POWER SOURCE 1455 | RESERVED (SET TO 0) 1462 |

| ELEMENT ID | LENGTH | ALLOCATION 1 | ALLOCATION 2 | ... | ALLOCATION n |
|---|---|---|---|---|---|
| 1801 | 1802 | 1803 | 1804 | 1805 | 1806 |

OCTETS: 1, 1, 15, 15, , 15

FIG. 19

| ALLO-CATION CONTROL | BF CONTROL | SOURCE AID | DESTI-NATION AID | ALLO-CATION START | ALLO-CATION BLOCK DURATION | NUMBER OF BLOCKS | ALLO-CATION BLOCK PERIOD |
|---|---|---|---|---|---|---|---|
| 1901 | 1902 | 1903 | 1904 | 1905 | 1906 | 1907 | 1908 |

OCTETS: 2, 2, 1, 1, 4, 2, 1, 2

FIG. 20

| ALLO-CATION ID | ALLO-CATION TYPE | PSEUDO-STATIC | TRUNCA-TABLE | EXTEND-ABLE | PCP ACTIVE | LP SC USED | RE-SERVED |
|---|---|---|---|---|---|---|---|
| 2001 | 2002 | 2003 | 2004 | 2005 | 2006 | 2007 | 2008 |

BITS: 4, 3, 1, 1, 1, 1, 1, 4

| | 2101 | 2102 | 2103 | 2104 |
|---|---|---|---|---|
| | BIT 4 | BIT 5 | BIT 6 | MEANING |
| 2105 | 0 | 0 | 0 | SP ALLOCATION |
| 2106 | 1 | 0 | 0 | CBAP ALLOCATION |
| 2107 | ALL OTHER COMBINATIONS | | | RESERVED |
| 2108 | | | | |

FIG. 21

GROUP OWNER RENEGOTIATION IN A WIRELESS NETWORK

CROSS-REFERENCE TO RELATED APPLICATIONS

The present application is a continuation application of U.S. patent application Ser. No. 13/623,228, entitled "GROUP OWNER RENEGOTIATION IN A WIRELESS NETWORK" and filed on Sep. 20, 2012, the entirety of which is incorporated by reference herein.

BACKGROUND OF THE INVENTION

Field of the Invention

The present invention relates generally to networking and more specifically to group ownership of a network.

Description of the Related Art

A wireless peer-to-peer (P2P) network may be organized into one or more wireless groups. Each wireless group typically has a group owner (GO) and one or more clients. The group owner exercises control over wireless communications within the group. For example, the Wireless Gigabit Alliance (WiGig) has promulgated a 60 Gigahertz personal area network (PAN) standard whereby peer devices may form a wireless group, whereby one of the clients becomes a Personal Basic Service Set (PBSS) Coordination Point (PCP) that then serves as the group owner for the group by, for example, handling the beacon frame transmission for the group, as well as managing the membership of the group. However, as the PCP is a peer client in the workgroup, any number of circumstances may require the peer client acting as the PCP to cease to do so. Conventionally, the departure of the current PCP from the work group typically results in the termination of the work group and thus necessitates the subsequent creation of a new workgroup for the remaining members, which is a complicated and time-consuming process.

BRIEF DESCRIPTION OF THE SEVERAL VIEWS OF THE DRAWINGS

The present invention may be better understood, and its features made apparent to those skilled in the art by referencing the accompanying drawings.

FIG. 1 is a block diagram illustrating a system in which group ownership may be transferred from an incumbent group owner device to a prospective group owner device in accordance with at least one embodiment.

FIG. 5 is a table of action field values in accordance with at least one embodiment.

FIG. 8 is a table pertaining to a directional band (dband) handoff request frame in accordance with at least one embodiment.

FIG. 9 is a table pertaining to a directional band (dband) handoff response frame in accordance with at least one embodiment.

FIG. 10 is a table pertaining to an intention/capacity request frame in accordance with at least one embodiment.

FIG. 11 is a table pertaining to an intention/capacity response frame in accordance with at least one embodiment.

FIG. 12 is a table pertaining to a directional band (dband) handoff confirmation frame in accordance with at least one embodiment.

FIG. 14 is a block diagram illustrating a format of a data communication of parameters in accordance with at least one embodiment.

FIG. 18 is block diagram illustrating a format of extended schedule element 1283 of FIG. 12 in accordance with at least one embodiment.

FIG. 19 is a block diagram illustrating a format of allocation fields 1803, 1804, 1805, and 1806 of FIG. 18 in accordance with at least one embodiment.

FIG. 20 is a block diagram illustrating a format of allocation control field 1901 of FIG. 19 in accordance with at least one embodiment.

FIG. 21 is a table illustrating possible values of bits of allocation type field 2002 of FIG. 20 in accordance with at least one embodiment.

The use of the same reference symbols in different drawings indicates similar or identical items.

DETAILED DESCRIPTION OF THE INVENTION

Figure 2:
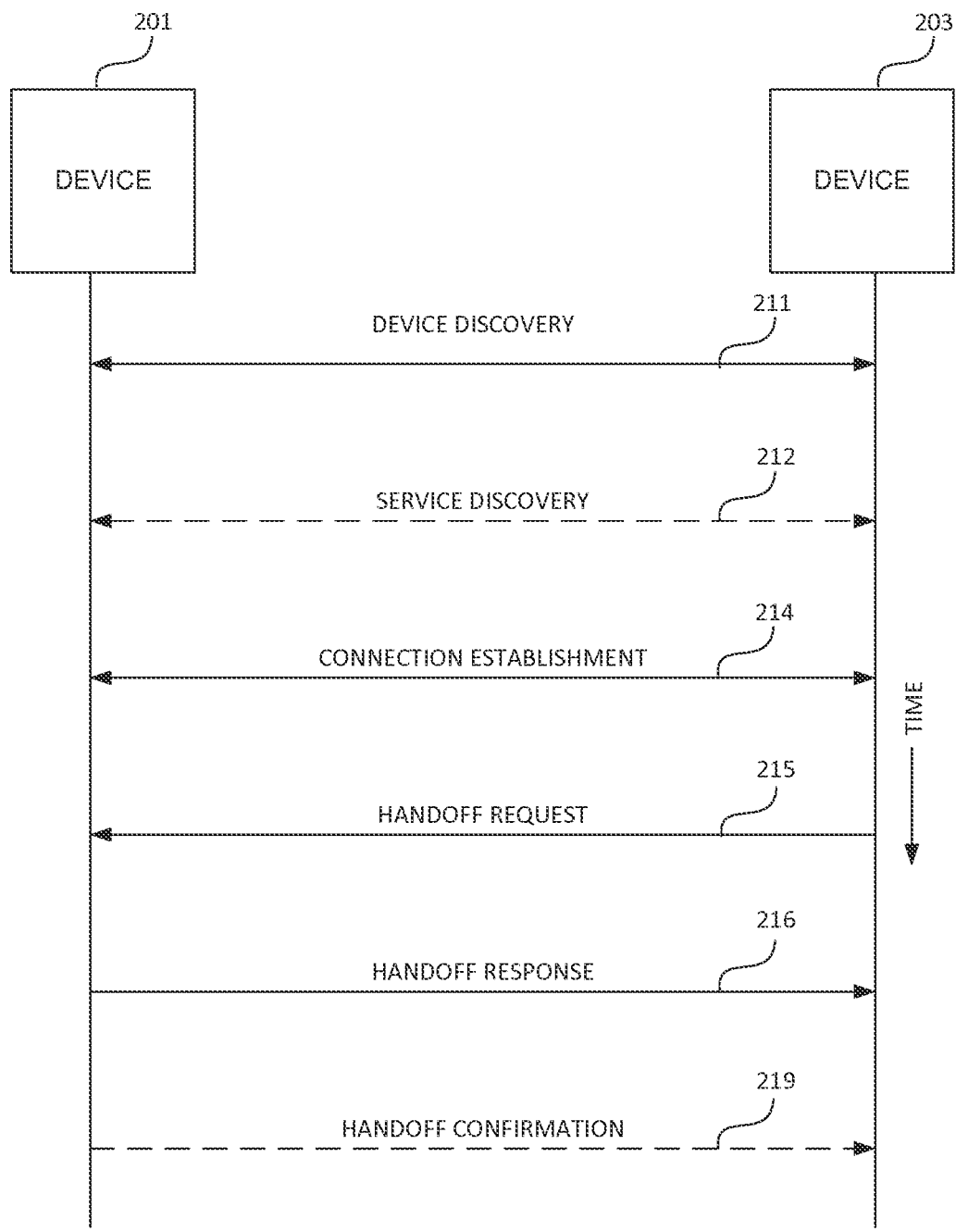
FIG. 2 is a timeline diagram of a process whereby a client with a higher self_PCP_factor requests a PCP handoff, with the PCP rejecting or accepting the request, in accordance with at least one embodiment.

A method and apparatus for group owner (GO) renegotiation is provided. For example, the method and apparatus may be used for GO renegotiation in a wireless personal network (WPAN), for example, a 60-gigahertz (60 GHz) peer-to-peer (P2P) wireless network. In a 60 GHz P2P network, the incumbent group owner (e.g., personal base station set (PBSS) coordination point (PCP)) controls the operation of the group. Group owner renegotiation can occur, for example, when a newly arriving device (e.g., a prospective group owner) is trying to connect to the personal base station set (PBSS) and/or, for example, with PCP rearrangement among members of an existing group. As an example, after the formation of the group, the PCP may want to relinquish the role of being the PCP. Also, multiple group membership for a 60 GHz device is expensive and complex operation. A procedure is described for deciding between clients and the PCP which device will assume the role of being the group owner (e.g., PCP) from the existing PCP. The frame exchanges involved in PCP handoff are also disclosed.

FIG. 1 is a block diagram illustrating a system in which group ownership may be transferred from an incumbent group owner device to a prospective group owner device in accordance with at least one embodiment. A network system comprises device 101, device 102, and network 104. Device 101 is connected to network 104 via connection 105. Device 102 is connected to network 104 via connection 106. Device 101, may, for example, be a television (TV), and device 102, may, for example, be a smartphone. Each device has a device group ownership suitability indicator indicative of a suitability of the device to serve as a group owner. As an example, an incumbent group owner device has an incumbent group owner device group ownership suitability indicator indicative of a suitability of the incumbent group owner device to serve as a group owner. As an example, a prospective group owner device has a prospective group ownership suitability indicator indicative of a suitability of the prospective group owner device to serve as a group owner. As an example, a group ownership suitability indicator may be a self personal base station set (PBSS) control point (PCP) factor (self_PCP_factor). As an example, a group ownership suitability indicator may be assigned to the device during its manufacture or may be subsequently programmed. For example, a self_PCP_factor may be programmed in a device by the device's manufacturer in accordance with capabilities of the device. As an example, the self_PCP_factor may be derived, at least in part, from the device's media access control (MAC) address. As an example, the self_PCP_factor may be based, at least in part, on whether the device can transmit. As an example, the self_PCP_factor may be based, at least in part, on the device's timing characteristics, for example, its beacon timing interval (BTI) and/or the range of BTIs of devices with which it may interact that it can accommodate. As an example, the self_PCP_factor may be based, at least in part, on the device's ability or inability to provide resources to one or more clients. As an example, the self_PCP_factor may be based, at least in part, on the device's ability or inability to provide a cross-connection to at least one other network. As an example, the self_PCP_factor may be based, at least in part, on the device's ability or inability to support beamforming among multiple clients. As another example, the self_PCP_factor may be based, at least in part, on a type of power source powering the device. As another example, the self_PCP_factor may be based, at least in part, on an amount of battery power remaining for the device. As another example, the self_PCP_factor may be based, at least in part, on an application priority, wherein an application of a higher priority may have more weight in determining a group owner than an application of a lower priority. As another example, the self_PCP_factor may be based, at least in part, on an application necessity, wherein an application may require that the device on which it is executing be a group owner. As another example, the self_PCP_factor may be based, at least in part, on a processing capability of the device. As another example, the self_PCP_factor may be based, at least in part on a memory capacity of the device. As another example, the self PCP factor may be based, at least in part on a networking throughput capacity of the device. As another example, the self_PCP_factor may be based, at least in part, on a likelihood of the second wireless device to remain stationary. Such abilities and/or inabilities and other criteria may provide a gauge of suitability of a device to serve as a group owner, and a group ownership suitability indicator may be derived from such abilities and/or inabilities and other criteria. A device's self_PCP_factor may be changed after manufacturing. As an example, a group ownership suitability indicator of a device may be dynamically modified in response to a changed condition of the device. As an example, a device's self_PCP_factor may be changed if the device is upgraded or downgraded and/or a new option is installed in the device or an existing option is removed from the device, thereby changing the device's capabilities. As another example, a device's self_PCP_factor may be changed according to a network management operation to reflect a desired change in an operational characteristic of a network. The self_PCP_factor reflects a relative suitability of the device to serve as a personal base station set (PBSS) control point (PCP) (e.g., a group owner) in a group connected via wireless networking technology (e.g., a wireless personal area network (WPAN), and, as a more specific example, a 60 GHz peer-to-peer (P2P) WPAN).

Device 101 and device 102 discover each other. The device (e.g., device 101) with the higher self_PCP_factor assumes the role of PCP in forming a group 109 comprising the device 101 and the device 102. Thus, wireless networking is established between device 101 and device 102, and negotiation of which device (e.g., device 101) should serve as PCP is completed.

After a group has been formed, and a wireless peer-to-peer group owner device (e.g., PCP) has been established, a new device (e.g., device 103) may discover the existing group 109. If the new device is to join the group 109, it may be appropriate for the new device to join the group 109 as a client device, leaving the incumbent group owner device to continue to serve as the wireless peer-to-peer group owner device, or it may be appropriate for the new device to become the wireless peer-to-peer group owner device of the group 109 (e.g., if a group ownership suitability indicator of the new device indicates it to be more suitable to serve as the group owner as compared to the group ownership suitability indicator of the incumbent group owner device). As an example, device 103 discovers the group 109 comprising device 101 and device 102 after receiving a directional band (dband) beacon from device 101, which is serving as the wireless peer-to-peer group owner device (e.g., PCP) for the group 109. The directional band (dband) beacon may include the self_PCP_factor of the device 101. As an example, the device 101 may be a TV with a self_PCP_factor of 10, which may be higher than a self_PCP_factor of the device 102, which may, for example, be 2 if, for example, the device 102 is a smartphone. Thus, the device 101, having a higher self_PCP_factor than the device 102, established itself as the PCP (e.g., incumbent group owner). If the device 103 has an even higher self_PCP_factor (e.g., if the device 103 is a laptop computer with a self_PCP_factor of 12) than the incumbent group owner, the device 103 has two choices. One choice is that the device 103 could make a new group with the device 101. Another choice is that the device 103 could join the existing group 109 comprising the device 101 and the device 102 and then trigger a PCP handoff to assume the role of PCP. Either of those choices may be effected over a connection 108 between device 103 and device 101.

For example, a situation may occur where device 103 wants to communicate with device 102. Device 103 has several options. As an example, device 103 may form a new group with device 102 and have a direct peer-to-peer (P2P) communication link between device 102 and device 103. As another example, device 103 may perform communication through the incumbent group owner (e.g., device 101) in a two-hop manner (e.g., from device 103 to device 101 to device 102 and from device 102 to device 101 to device 103). As a further example, device 103 may request the incumbent group owner (e.g., device 101) provide the device 103 with a tunneled direct link setup (TDLS) connection to device 102. As yet another example, device 103 may join the existing group 109 comprising device 101 and device 102 and then trigger a PCP handoff.

For device 103 to form a new group with device 102 and have a direct peer-to-peer (P2P) communication link between device 102 and device 103, being a member of multiple P2P groups is complex. Being a member of multiple P2P groups is expensive in terms of resource consumption, involves at least two times as much beamforming activity, involves complex tracking of a beacon transmission interval (BTI), and/or involves high power consumption.

For device 103 to perform communication through the incumbent group owner (e.g., device 101) in a two-hop manner (e.g., from device 103 to device 101 to device 102 and from device 102 to device 101 to device 103), performance is adversely affected, as the communication is no longer peer-to-peer (P2P), as the two peers are no longer directly in communication with one another. For device 103 to request the incumbent group owner (e.g., device 101) to provide the device 103 with a tunneled direct link setup (TDLS) connection to device 102, the PCP (e.g., device 101) is required to support TDLS, which in itself is another standard. Also, for TDLS support, the presence of an access point (AP) is necessary, which also departs from the peer-to-peer (P2P) paradigm. Thus it is often in the best interest of a 60 GHz P2P device to avoid being a member of multiple P2P groups.

If an incumbent group owner (e.g., device 101) decides to relinquish its role as PCP, it formerly would have to dissolve the entire peer-to-peer (P2P) group, which would interrupt the operation of all devices that are members of the group. By utilizing the exchange of the following frames to facilitate the PCP handoff in a 60 GHz P2P group, an incumbent group owner (e.g., device 101) can communicate its intention to relinquish its role as PCP, establishing a prospective group owner (e.g., device 103) to be the new group owner (e.g., the new PCP) and/or a prospective group owner (e.g., a client of the incumbent group owner, such as device 103) can communicate its intention to assume the role of PCP for the group 109, relieving the incumbent group owner (e.g., device 101) of such role: a handoff request, a handoff response, an intention/capacity request, an intention/capacity response, and a handoff confirmation. By initiating the exchange of these frames, a device (e.g., device 103) may trigger the GO renegotiation procedure. As a result of such a procedure, a GO handoff is enabled to occur.

In accordance with at least one embodiment, the incumbent group owner may transmit an intention/capacity request as a way of broadcasting an intent to relinquish group ownership. Upon receiving the intention/capacity request, a prospective group owner may respond with an intention/capacity response, which may include a group ownership suitability indicator for the prospective wireless device. The group ownership suitability indicator is received from the prospective group owner in response to the incumbent group owner broadcasting an intent to relinquish group ownership. In accordance with at least one embodiment, the incumbent group owner is a wireless device, and the prospective group owner is a wireless device.

In accordance with at least one embodiment, the prospective group owner may transmit a handoff request as a way of broadcasting an intent to take over the group ownership. Upon receiving the handoff request, an incumbent group owner may respond with a handoff response, which may include an accept, decline, or accept with condition status. The group ownership suitability indicator is received from the prospective group owner in the handoff request. In accordance with at least one embodiment, the incumbent group owner is a wireless device, and the prospective group owner is a wireless device.

In accordance with at least one embodiment, GO renegotiation provides simplicity in implementation and operation. In accordance with at least one embodiment, GO renegotiation avoids situations in which a device (e.g., device 103) is simultaneously a member of multiple P2P groups. In accordance with at least one embodiment, GO renegotiation avoids situations in which two devices (e.g., device 102 and device 103) have to communicate through a third device (e.g., device 101), compromising the peer-to-peer (P2P) paradigm. In accordance with at least one embodiment, GO renegotiation avoids a need to implement TDLS, which brings the requirement of the presence of an access point (AP) in the network, compromising the peer-to-peer (P2P) paradigm. In accordance with at least one embodiment, GO renegotiation allows an incumbent group owner (e.g., device 101) to relinquish the role of group owner to another device (e.g., device 103) without dissolving the 60 GHz P2P group 109 and disrupting ongoing communications in the group 109.

As noted above and as shown in the lower portion of FIG. 1, a device 183 may join an existing group 189 comprising a device 181 and a device 182. Device 181 is connected via connection 185 to network 184, which is connected via connection 186 to device 182. Device 183 joins the existing group 189, connecting via connection 187 to network 184, thereby providing connectivity via connection 185 to device 181 and via connection 186 to device 182.

As an example, device 183, which may, for example, be a laptop computer, joins an existing 60 GHz P2P group 189 even though the self_PCP_factor of device 183 is higher in value than the self_PCP_factor of the PCP (e.g., device 181, which may, for example, be a TV). The device 183 (e.g., the laptop computer) has an intention to connect to the device 182, which may, for example, be a smartphone, and to be the group owner (GO) (e.g., PCP) to run its application. After joining the existing group 189, the device 183 (e.g., laptop computer) transmits a handoff request to the PCP (e.g., device 181 (e.g., TV)). Through this request the device 183 (e.g., the laptop computer) makes the device 181 (e.g., TV) aware of its desire to be PCP (e.g., group owner). The device 181 (e.g., TV) may decide to relinquish its role of PCP and assign the role of PCP to the device 183 (e.g., the laptop computer).

As noted above, it is possible for a wireless peer-to-peer group owner device (e.g., device 181) to initiate relinquishment of its role as group owner device in accordance with at least one embodiment. The group 189 initially comprises device 181 and device 182. Device 181 is connected via connection 185 to network 184, which is connected via connection 187 to device 183. The device 181, which may, for example, be a TV, and the device 183, which may, for example, be a laptop computer, discover each other. If the device 183 has a higher self_PCP_factor (e.g., for example, a self_PCP_factor of 12) than the device 181 (e.g., for example, a self_PCP_factor of 10), the device 183 (e.g., the laptop computer) with higher self_PCP_factor assumes the role of PCP (e.g., group owner). It may, at some point in time, be the case that the device 183 (e.g., the laptop) wants to relinquish the role of PCP (e.g., group owner). In such a case, the device 183 (e.g., the laptop) can trigger a PCP handoff.

FIG. 2 is a timeline diagram of a process whereby a client with a higher self_PCP_factor requests a PCP handoff, with the PCP rejecting or accepting the request, in accordance with at least one embodiment. The timeline need not be linear and need not be to scale but is illustrated using seemingly uniform time intervals for clarity. In accordance with a case of PCP handoff, a client with higher self_PCP_factor than an existing PCP (e.g., group owner) requests a PCP handoff and the PCP (e.g., group owner) rejects or accepts the request. If the existing PCP accepts the request, the client with the higher self_PCP_factor requesting the PCP handoff becomes the new PCP, and the existing PCP relinquishes its role as PCP. If the existing PCP rejects the request, the existing PCP maintains its role as PCP, and the client with the higher self_PCP_factor remains a client relative to the existing PCP.

As an example, a device 203 (e.g., a laptop computer) with a higher self_PCP_factor than the existing PCP (e.g., device 201 (e.g., a TV)) joins, as a client, the group having the device 201 (e.g., the TV) as its PCP. Joining the group involves device discovery 211 between device 201 and device 203, followed by service discovery 212 between device 201 and device 203, followed by connection establishment 214 between device 201 and device 203.

The device 203 (e.g., the laptop computer) requests PCP handoff from the device 201 (e.g., the TV), which is the existing PCP. The device 203 (e.g., the laptop computer), in its role as a client, transmits a unicast handoff request public action frame to the PCP (e.g., the device 201). In one case, the PCP (e.g., device 201 (e.g., the TV)) transmits a unicast handoff response public action frame to the client (e.g., the device 203 (e.g., the laptop computer)) with a status code of request reject. In another case, the PCP (e.g., device 201 (e.g., the TV)) transmits a unicast handoff response public action frame to the client (e.g., the device 203 (e.g., the laptop computer)) with a status code of request accept. In the event the PCP accepts the handoff request, the PCP (e.g., device 201 (e.g., the TV)) broadcasts a handoff confirmation to all members of the group, confirming that the device 203 (e.g., the laptop computer) is appointed to serve as PCP (e.g., group owner) and the device 201 (e.g., the TV) is relinquishing its role as PCP (e.g., group owner).

Figure 3:
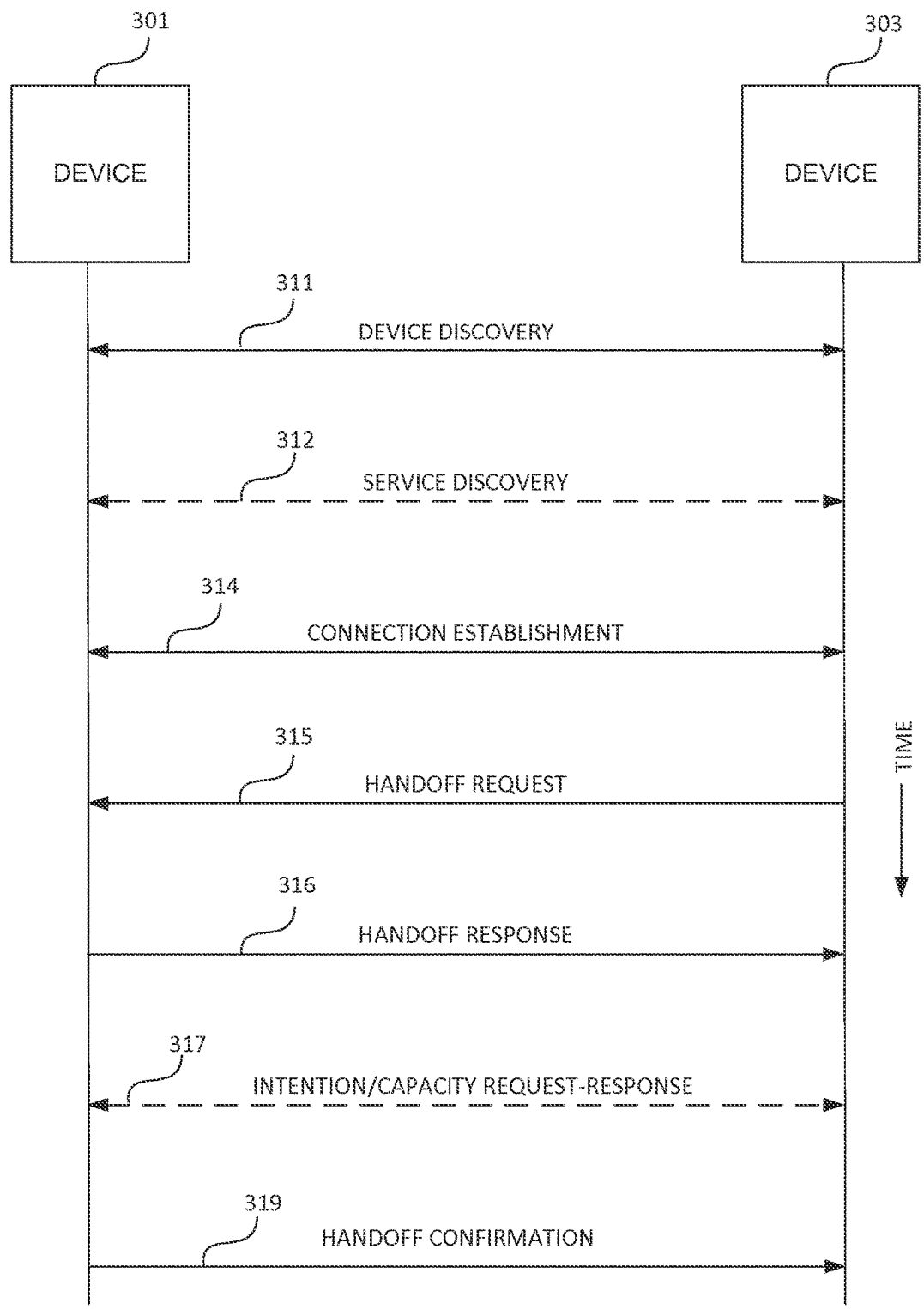
FIG. 3 is a timeline diagram of a process whereby a client with a higher self_PCP_factor requests a PCP handoff, with the PCP accepting the request and checking whether any other client is interested in being the PCP, in accordance with at least one embodiment.

FIG. 3 is a timeline diagram of a process whereby a client with a higher self_PCP_factor requests a PCP handoff, with the PCP accepting the request and checking whether any other client is interested in being the PCP, in accordance with at least one embodiment. The timeline need not be linear and need not be to scale but is illustrated using seemingly uniform time intervals for clarity. In accordance with a second case of PCP handoff, a client with higher self_PCP_factor requests a PCP handoff and the PCP (e.g., group owner) accepts the request and checks whether any other client is interested in being the PCP.

As an example, a device 303 (e.g., a laptop computer) with a higher self_PCP_factor than an existing PCP (e.g., device 301 (e.g., a TV)) joins the group having device 301 (e.g., the TV) as its PCP. Joining the group involves device discovery 311 between device 301 and device 303, followed by service discovery 312 between device 301 and device 303, followed by connection establishment 314 between device 301 and device 303.

The device 303, acting as a client in the group, transmits a unicast handoff request public action frame 315 to the PCP (e.g., device 301 (e.g., a TV)). The PCP (e.g., device 301 (e.g., a TV)) transmits a unicast handoff response public action frame 316 to the device 303 (e.g., the client) with a status code of request accept with a condition. The PCP (e.g, device 301 (e.g., a TV) broadcasts an intention/capacity request public action frame 317. All clients interested in becoming PCP transmit a unicast intention/capacity response public action frame to the PCP (e.g., device 301 (e.g., a TV)). The PCP (e.g., device 301 (e.g., a TV)) decides the new PCP and broadcasts a handoff confirmation public action frame 319.

Figure 4:
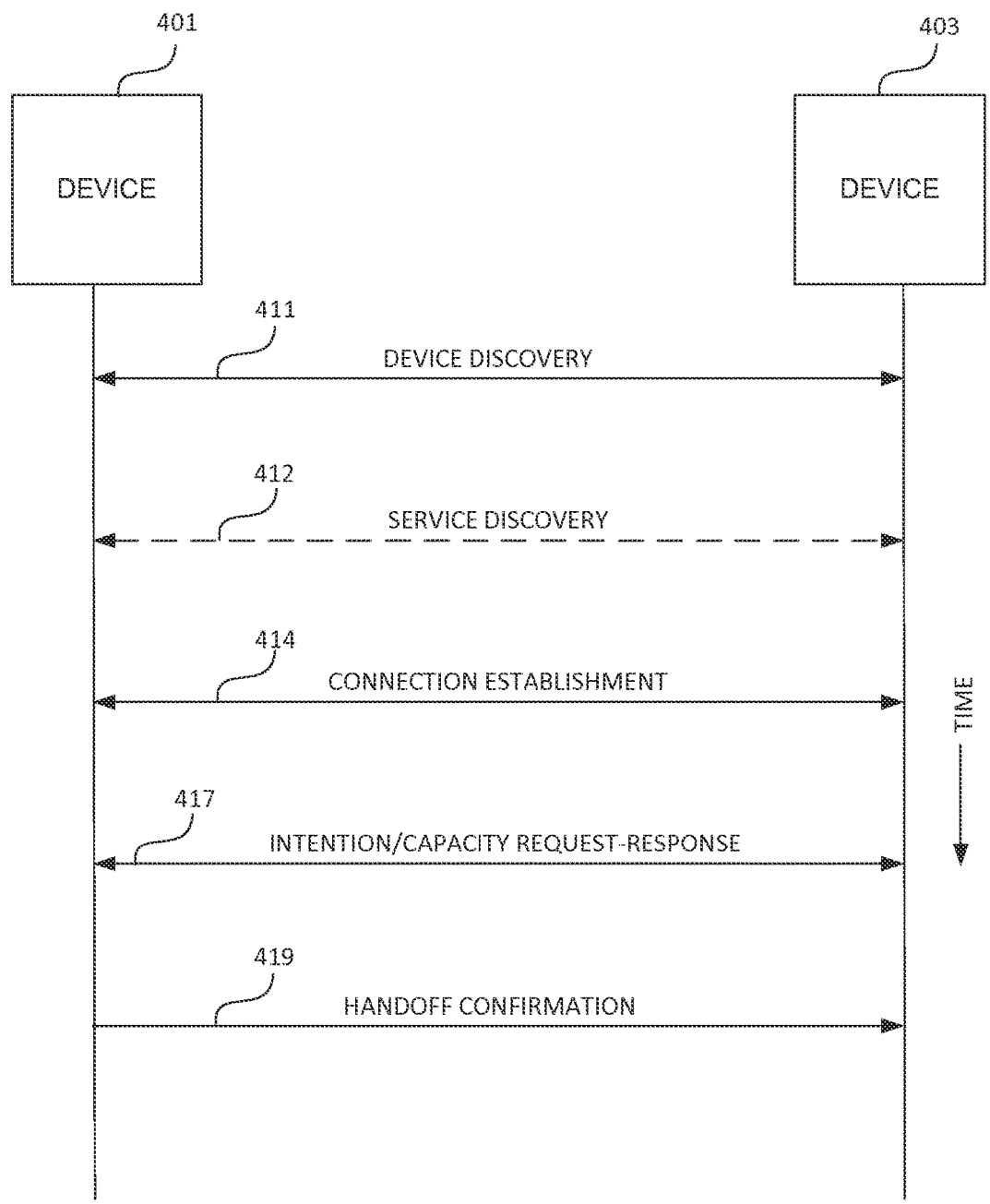
FIG. 4 is a timeline diagram of process whereby the PCP triggers a handoff procedure in accordance with at least one embodiment.

FIG. 4 is a timeline diagram of process whereby the PCP triggers a handoff procedure in accordance with at least one embodiment. The timeline need not be linear and need not be to scale but is illustrated using seemingly uniform time intervals for clarity. In a third case of a PCP handoff, the PCP (e.g., device 301 (e.g., a TV)) triggers the handoff procedure by itself.

As an example, a device 403 (e.g., a laptop computer) with a higher self_PCP_factor than an existing PCP (e.g., device 401 (e.g., a TV)) joins the group having device 401 (e.g., the TV) as its PCP. Joining the group involves device discovery 411 between device 401 and device 403, followed by service discovery 412 between device 401 and device 403, followed by connection establishment 414 between device 401 and device 403.

The PCP (e.g., device 301 (e.g., a TV)) broadcasts an intention/capacity request public action frame 417. All clients interested in becoming the PCP transmit a unicast intention/capacity response public action frame (also depicted as 417) to the PCP (e.g., device 301 (e.g., a TV)). The PCP (e.g., device 301 (e.g., a TV)) decides the new PCP and broadcasts a handoff confirmation public action frame 419.

FIG. 5 is a table of action field values in accordance with at least one embodiment. A directional band (dband) public action frame has an action field value selected from among the values shown in FIG. 9. For example, a power save configuration request 520 has an action field value of 0, a power save configuration response 521 has an action field value of 1, an information request 522 has an action field value of 2, an information response 523 has an action field value of 3, a handover request 524 has an action field value of 4, a handover response 525 has an action field value of 5, a DTP request 526 has an action field value of 6, a DTP response 527 has an action field value of 7, a handoff request 515 has an action field value of 8, a handoff response 516 has an action field value of 9, an intention/capacity request 517 has an action field value of 10, an intention/capacity response 518 has an action field value of 11, and a handoff confirmation 519 has an action field value of 12.

Figure 6:
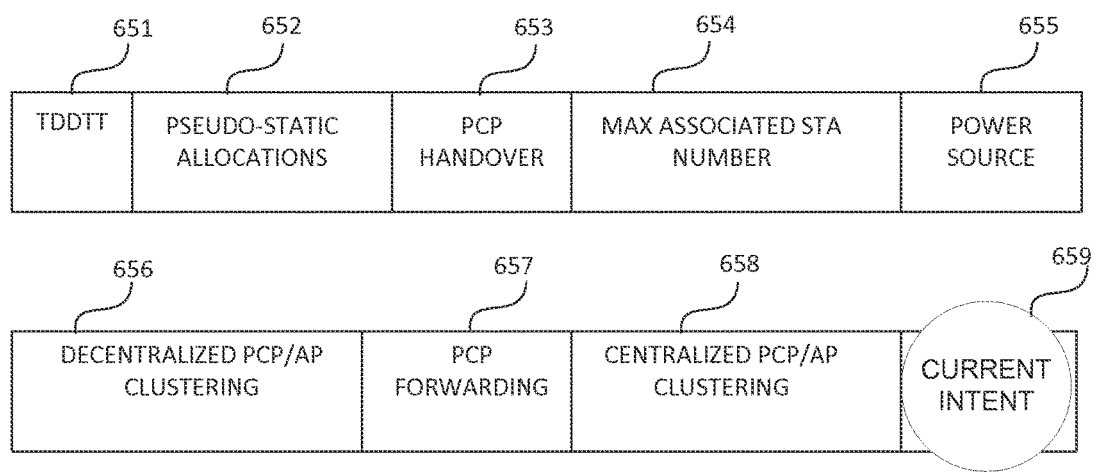
FIG. 6 is a block diagram illustrating a format of a data communication of parameters in accordance with at least one embodiment.

FIG. 6 is a block diagram illustrating a format of a data communication of parameters in accordance with at least one embodiment. A directional band (dband) PCP/AP capability IE comprises a first bit B0 for a TDDTT 651, a second bit B1 for pseudo-static allocations 652, a third bit B2 for a PCP handover indication 653, a fourth bit B3 through an eleventh bit B10 for a maximum associated STA number 654, a twelfth bit B11 for a power source indication 655, a thirteenth bit B12 for a decentralized PCP/AP clustering indication 656, a fourteenth bit B13 for a PCP forwarding indication 657, a fifteenth bit B14 for a centralized PCP/AP clustering indication 658, and a sixteenth bit B15 for a current intent indication 659.

The current intent field value is set based on many factors including device power status, device resource availability status, and device application related requirements. The current intent field value may be added as a one-bit value or as a more-than-one-bit value.

Figure 7:
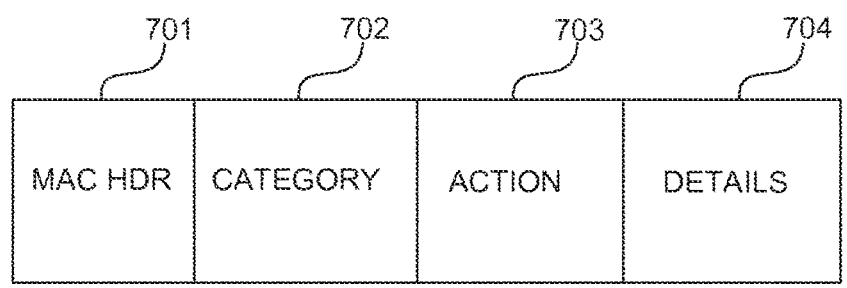
FIG. 7 is block diagram illustrating a directional band (dband) public action frame and the fields it comprises in accordance with at least one embodiment.

FIG. 7 is block diagram illustrating a directional band (dband) public action frame and the fields it comprises in accordance with at least one embodiment. A directional band (dband) public action frame comprises a MAC header 701, a category field 702, an action field 703, and a details field 704. A directional band (dband) public action frame has a frame control field specifying a type and a subtype. Bits 2 through 3 of the frame control field have a binary value of 00 (i.e., bits 2 and 3 each have a value of zero), denoting a management type. Bits 4 through 7 of the frame control field have a binary value of 1101, denoting an action subtype. The directional band (dband) public action frame has a category field having a hexadecimal value of 10, denoting directional band (dband). The directional band (dband) public action frame has an action field having a value selected from the values shown in FIG. 9.

FIG. 8 is a table pertaining to a directional band (dband) handoff request frame in accordance with at least one embodiment. A directional band (dband) handoff request frame comprises a plurality of fields 871 having respective lengths 872 and respective descriptions 873. A directional band (dband) handoff request frame has a category field 874 having a length of one byte, which is set to indicate a directional band (dband) frame. A directional band (dband) handoff request frame has an action field 875 having a length of two bytes, which are set to indicate the action frame type. A directional band (dband) handoff request frame has a dialog token field 876 having a length of one byte, which is set to a value chosen to uniquely identify the transaction. A directional band (dband) handoff request frame has a directional band (dband) PCP/AP capability IE field 877 having a length of two bytes, which are set to a directional band (dband) PCP/AP capability IE.

FIG. 9 is a table pertaining to a directional band (dband) handoff response frame in accordance with at least one embodiment. A directional band (dband) handoff response frame comprises a plurality of fields 971 having respective lengths 972 and respective descriptions 973. A directional band (dband) handoff response frame has a category field 974 having a length of one byte, which is set to indicate a directional band (dband) frame. A directional band (dband) handoff response frame has an action field 975 having a length of two bytes, which are set to indicate the action frame type. A directional band (dband) handoff response frame has a dialog token field 976 having a length of one byte, which is set to a value chosen to uniquely identify the transaction. The dialog token field is set to the same value as in the preceding directional band (dband) handoff request frame. A directional band (dband) handoff response frame has a status field 978 having a length of one byte, which is set to indicate a decision of PCP.

FIG. 10 is a table pertaining to an intention/capacity request frame in accordance with at least one embodiment. An intention/capacity request frame comprises a plurality of fields 1071 having respective lengths 1072 and respective descriptions 1073. An intention/capacity request frame has a category field 1074 having a length of one byte, which is set to indicate a directional band (dband) frame. An intention/capacity request frame has an action field 1075 having a length of two bytes, which are set to indicate the action frame type. An intention/capacity request frame has a dialog token field 1076 having a length of one byte, which is set to a value chosen to uniquely identify the transaction.

FIG. 11 is a table pertaining to an intention/capacity response frame in accordance with at least one embodiment. An intention/capacity response frame comprises a plurality of fields 1171 having respective lengths 1172 and respective descriptions 1173. An intention/capacity response frame has a category field 1174 having a length of one byte, which is set to indicate a directional band (dband) frame. An intention/capacity frame has an action field 1175 having a length of two bytes, which are set to indicate the action frame type. An intention/capacity response frame has a dialog token field 1176 having a length of one byte, which is set to a value chosen to uniquely identify the transaction. The dialog token field is set to the same value as in the preceding intention/capacity request frame. An intention/capacity response frame has a directional band (dband) PCP/AP capability IE field 1177 having a length of two bytes, which are set to a directional band (dband) PCP/AP capability IE.

FIG. 12 is a table pertaining to a directional band (dband) handoff confirmation frame in accordance with at least one embodiment. A directional band (dband) handoff confirmation frame comprises a plurality of fields and information elements 1271 having respective lengths 1272 and respective descriptions 1273, as shown by heading 1274, wherein an information element may comprise multiple fields. A directional band (dband) handoff confirmation frame has a category field 1275 having a length of one byte, which is set to indicate a directional band (dband) frame. A directional band (dband) handoff confirmation frame has an action field 1276 having a length of two bytes, which are set to indicate the action frame type. A directional band (dband) handoff confirmation frame has a dialog token field 1277 having a length of one byte, which is set to a value chosen to uniquely identify the transaction. A directional band (dband) handoff confirmation frame has a new PCP MAC address field 1279 having a length of six bytes, which are set to a MAC address of the new PCP. Note that a DHCP server is not necessarily located at a PCP in a 60 GHz P2P group. A directional band (dband) handoff confirmation frame has a service set identifier (SSID) field 1280 having a length of zero to 32 bytes, which contains the service set identifier of the network. The SSID is the name of the network being run by the incumbent group owner. The prospective group owner inherits this name. A directional band (dband) handoff confirmation frame has a next target beacon transmit time (TBTT) field 1281 having a length of two bytes which provides a time offset in microseconds from the previous beacon transmission time. At the time instant next TBTT, the prospective group owner is expected to transmit a beacon. A directional band (dband) handoff confirmation frame has a group member list element 1282 having a length of n bytes which provides a group member list of the network. A group member list is the list of all the devices associated with the incumbent group owner. A group member list element 1282 carries information about the device MAC address, device capability, etc.

A directional band (dband) handoff confirmation frame has an extended schedule element 1283 having a length of N bytes which provides schedule information of the network. The extended schedule element 1283 has a format shown in FIG. 18, wherein the extended schedule element 1283 comprises a plurality of fields 1801 through 1806. FIG. 18 is block diagram illustrating a format of extended schedule element 1283 of FIG. 12 in accordance with at least one embodiment. (The extended schedule element is explained as defined in 802.11ad draft specification.) The element ID field 1801 has a length of one byte and contains an element ID which is equal to the value of an extended schedule. The length field 1802 for the extended scheduled element 1283 has a length of one byte and indicates the length of the information field. An extended schedule element 1283 comprises a plurality of allocation fields 1803, 1804, 1805, and 1806. The ellipsis of exemplary allocation field 1805 denotes that the number of allocation fields of the plurality of allocation fields may vary. The n of exemplary allocation field 1806 denotes that a number n allocation fields 1803, 1804, 1805, and 1806 are included within extended schedule element 1283. Each allocation field has a length of 15 bytes and is formatted as shown in FIG. 19, wherein each allocation field comprises a plurality of fields 1901 through 1908.

FIG. 19 is a block diagram illustrating a format of allocation fields 1803, 1804, 1805, and 1806 of FIG. 18 in accordance with at least one embodiment. The allocation control field 1901 has a length of two bytes and is formatted as shown in FIG. 20, wherein the allocation control field 1901 comprises a plurality of fields 2001 through 2008. FIG. 20 is a block diagram illustrating a format of allocation control field 1901 of FIG. 19 in accordance with at least one embodiment. The allocation ID field 2001, which has a length of four bits, when set to a non-zero value, identifies an airtime allocation from source association identifier (AID) to destination AID. Except for Contention Based Access Protocol (CBAP) allocations with broadcast source AID and broadcast destination AID, the tuple (source AID, destination AID, and allocation ID) uniquely identifies the allocation. For CBAP allocations with broadcast source AID and broadcast destination AID, the allocation ID is zero. The allocation type field 2002 has a length of three bits and defines the channel access mechanism during the allocation, with possible values listed in table of FIG. 21. FIG. 21 is a table illustrating possible values of bits of allocation type field 2002 of FIG. 20 in accordance with at least one embodiment. The three bits are designated bit 4, bit 5, and bit 6, where the values of bit 4 are shown in column 2101, the values of bit 5 are shown in column 2102, and the values of bit 6 are shown in column 2103, as shown by heading 2105. The meanings attributed to the values of bits 4, 5, and 6 shown in columns 2101, 2102, and 2103, respectively, are shown in column 2104. As shown by row 2106, when bits 4, 5, and 6 all have a value of zero, the allocation type field 2002 indicates an SP allocation. As shown by row 2107, when bit 4 has a value of one and bits 5 and 6 have a value of zero, the allocation type field 2002 indicates a CBAP allocation. As shown by row 2108, all other combinations of values of bits 4, 5, and 6 are reserved for future use.

The pseudo-static field 2003 has a length of one bit and is set to one to indicate that this allocation is pseudo-static and is set to zero otherwise. For an SP allocation, the truncatable field 2004 has a length of one bit and is set to one to indicate that the source STA and destination STA can request SP truncation and is set to zero otherwise. For CBAP allocations, the truncatable field 2004 is reserved. For an SP allocation, the extended field 2005 has a length of one bit and is set to one to indicate that source STA and destination STA can request SP extension and is set to zero otherwise. For CBAP allocation, the extended field 2005 is reserved. The PCP active field 2006 has a length of one bit and is set to one if the PCP is available to receive transmissions during the CBAP or SP allocation and is set to zero otherwise. The PCP active field 2006 is set to one if at least one of the truncatable field 2004 or the extended field 2005 is set to one, or when transmitted by the AP. The BF field 1902 has a length of two bytes and contains information specific to beamforming.

The source AID field 1903 has a length of one byte and is set to the AID of the STA that initiates channel access during the SP or CBAP allocation or, in case of CBAP allocation, can also be set to the broadcast AID if all STAs are allowed to initiate transmissions during CBAP allocation. The destination AID field 1904 has a length of one byte and indicates the AID of the STA that is expected to communicate with the source STA during the allocation or broadcast AID if all STAs are expected to communicate with the source STA during the allocation. The broadcast AID asserted in the source AID and the destination AID fields for an SP allocation indicates that during the SP a non-PCP/non-AP STA does not transmit unless it receives a poll or grant from the PCP/AP. The allocation start field 1905 has a length of four bytes and contains the lower four octets of the TSF at the time the SP or CBAP starts. The allocation start field 1905 can be specified at a future beacon interval when the pseudo-static field is set to one. The allocation block duration field 1906 has a length of two bytes and indicates the duration, in microseconds, of a contiguous time block for which the SP or CBAP allocation is made and cannot cross beacon interval boundaries. The allocation block duration field 1906 has a possible range from 1-32767 for an SP allocation and 1-65535 for a CBAP allocation. The number of blocks field 1907 has a length of one byte and contains the number of time blocks making up an allocation. The allocation block period field 1908 has a length of two bytes and contains the time in microseconds, between the start of two consecutive time blocks belonging to the same allocation. The allocation block period field is reserved when the number of blocks field 1907 is set to one.

The LP SC Used subfield 2007 has a length of one bit and is set to 1 to indicate that the low power SC PHY is used in this SP. Otherwise, it is set to zero. A directional band (dband) handoff confirmation frame has a vendor specific element element 1284 having a length of m bytes which contains a vendor specific element. Vendor specific element 1284 carries the vendor specific information and is reserved for use. A reserved field 2008 has a length of four bits. The prospective group owner has the freedom to set these fields according to its own capacity.

Figure 13:
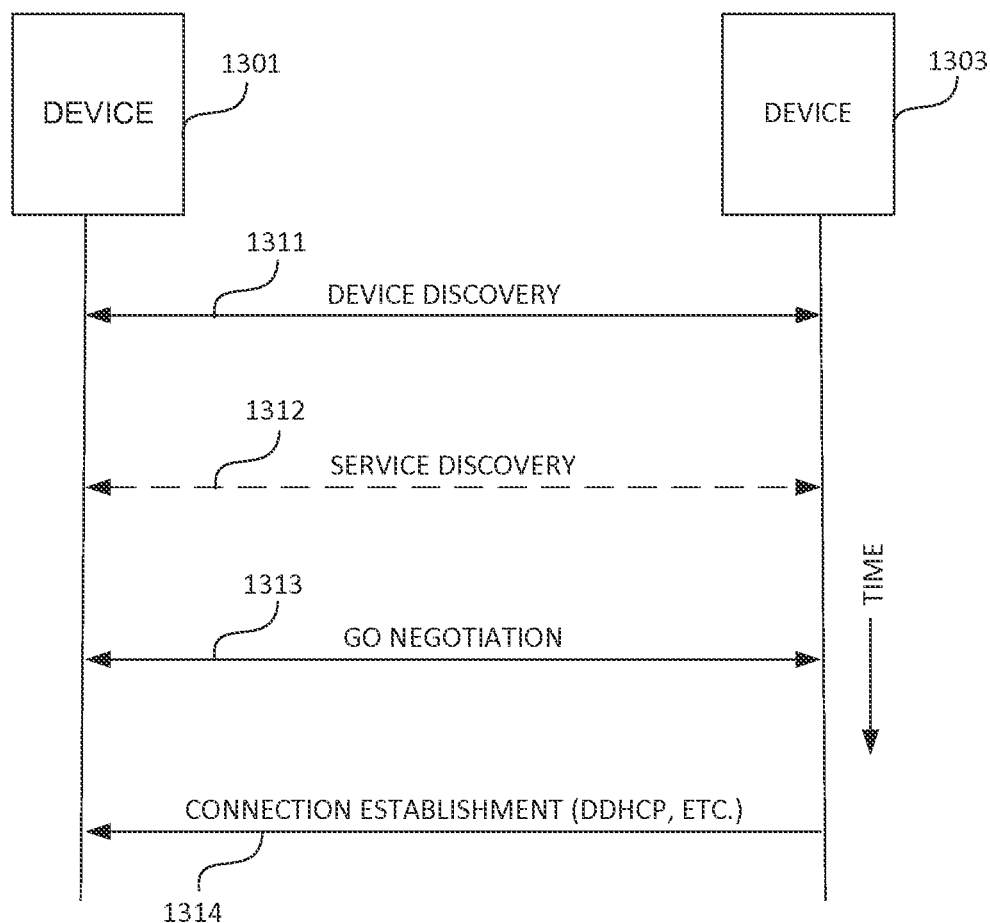
FIG. 13 is timeline diagram illustrating a process pertaining to a peer-to-peer (P2P) group in accordance with at least one embodiment.

FIG. 13 is timeline diagram illustrating a process pertaining to a peer-to-peer (P2P) group in accordance with at least one embodiment. The timeline need not be linear and need not be to scale but is illustrated using seemingly uniform time intervals for clarity. As an example, a device 1303 (e.g., a prospective group owner) joins a group in which device 1301 is serving as a PCP (e.g., the incumbent group owner). Joining the group involves device discovery 1611 between the device 1301 and the device 1303, service discovery 1612 between the device 1301 and the device 1303, group ownership (GO) negotiation 1613 between the device 1301 and the device 1303, and connection establishment (e.g., DDHCP, etc.) 1614 between the device 1301 and the device 1303.

As an example, device 1301 and device 1303 discover each other. Scanning (active and/or passive) may be used. Device 1301 and device 1303 may discover services of each other. A WSC with special IEs or 802.11u may be used. Device 1301 and device 1303 perform group ownership (GO) negotiation. Group ownership (GO) negotiation action frames can be used. A peer-to-peer (P2P) group is formed. The device 1301 and the device 1303 connect to each other. Other activity related to connection establishment, such as DHCP related activity, occurs between device 1301 and device 1303. New devices may join the P2P group in addition to device 1301 and device 1303.

FIG. 14 is a block diagram illustrating a format of a data communication of parameters in accordance with at least one embodiment. An exemplary frame comprises seven bits (bits B0 through B6) which are reserved for future use 1461. An exemplary frame comprises eight bits (bits B7 through B14) representing a maximum associated STA number 1454. An exemplary frame comprises seven bits (bits B15 through B21) representing a total number of sectors 1463. An exemplary frame comprises one bit (B22) indicating pseudo-static allocations 1452. An exemplary frame comprises one bit (B23) indicating TDDTT 1451. An exemplary frame comprises one bit (B24) indicating decentralized PCP/AP clustering 1456. An exemplary frame comprises one bit (B25) indicating a power source 1455. An exemplary frame comprises six bits (B26 through B31) reserved for future use 1462.

For deciding upon a group owner (GO) for wifi direct, an intent value within a range of 1 to 15 is defined for each device. The device with the higher intent value becomes the GO. A device with an intent value of 15 must always be the GO. A tie-breaker bit flag is provided to handle a case of two devices with the same intent value.

For deciding upon a group owner (GO) for WiGig, a self_PCP_factor is associated with each directional band (dband) device. A directional band (dband) device with higher self_PCP_factor value becomes the PCP. In case of a tie, the directional band (dband) device with higher NIC-specific part (3 least significant bytes (LSBs)) of the MAC address becomes the PCP.

Figure 15:
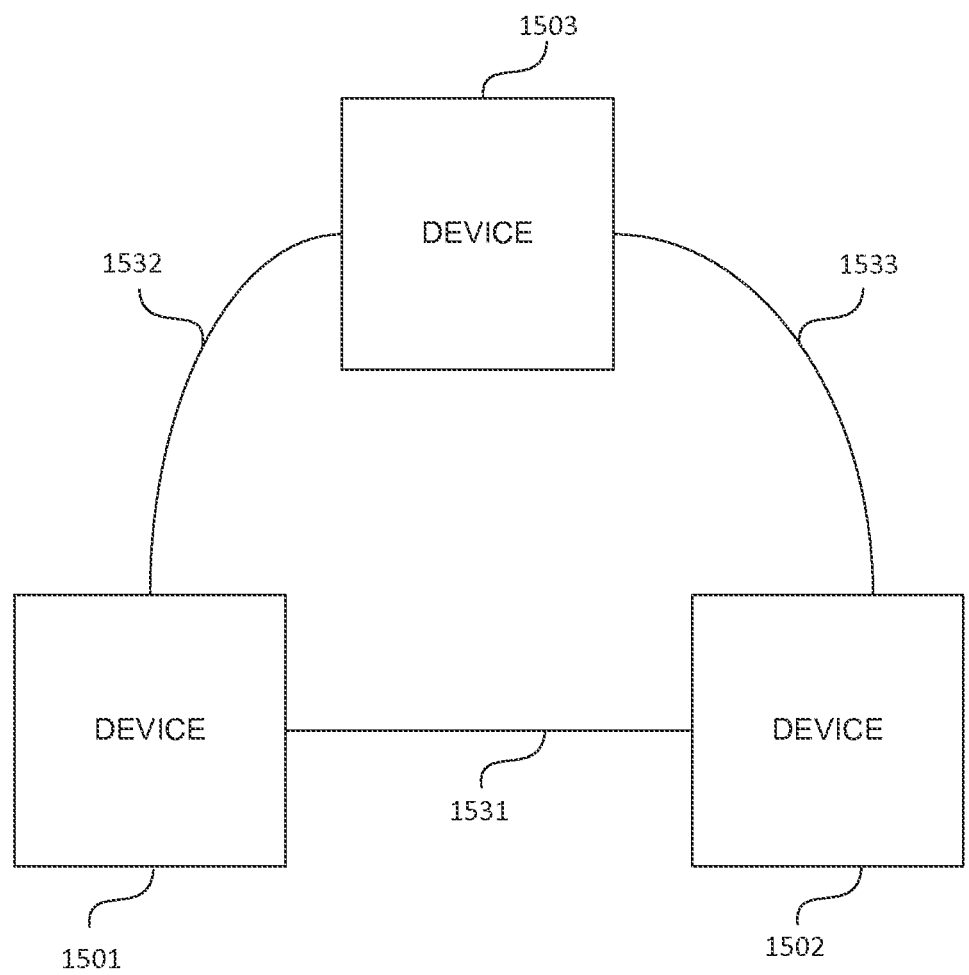
FIG. 15 is a block diagram illustrating group owner renegotiation in a group comprising a first device, a second device, and a third device in accordance with at least one embodiment.

FIG. 15 is a block diagram illustrating group owner renegotiation in a group comprising a first device, a second device, and a third device in accordance with at least one embodiment. A group comprises a device 1501, a device 1502, and a device 1503. The device 1501 is in communication with device 1502 via communication path 1531. The device 1501 is in communication with device 1503 via communication path 1532. The device 1502 is in communication with device 1503 via communication path 1533.

Group ownership (GO) re-negotiation may be triggered by an incumbent group owner (GO) (e.g., the PCP). In such case, the incumbent group owner (e.g., P2P GO) wants to relinquish job of being the GO. Group ownership (GO) re-negotiation may be triggered by a prospective group owner (e.g., a client). In such case, the prospective group owner triggers the GO re-negotiation based on its requirements (e.g., execution of an application that requires it to be the GO).

As an example, if device 1503 is an incumbent group owner, device 1503 broadcasts an intention/capacity request frame, which is received by device 1501, as a first client of incumbent group owner 1503 and by device 1502, as a second client of incumbent group owner 1503. Device 1501, as the first client of incumbent group owner 1503, and device 1502, as the second client of incumbent group owner 1503, each respond to the intention/capacity request frame with an intention/capacity response frame sent as a unicast to the device 1503, the incumbent group owner. Device 1503, as the incumbent group owner, then decides upon which of device 1501 and device 1502 will be the new group owner (unless device 1503 decides to retain its role as incumbent group owner). After finalizing the new group owner, the device 1503, as incumbent group owner relinquishes its role by broadcasting a handoff confirmation frame confirming designation of device 1501 or device 1502 as the new group owner.

Figure 16:
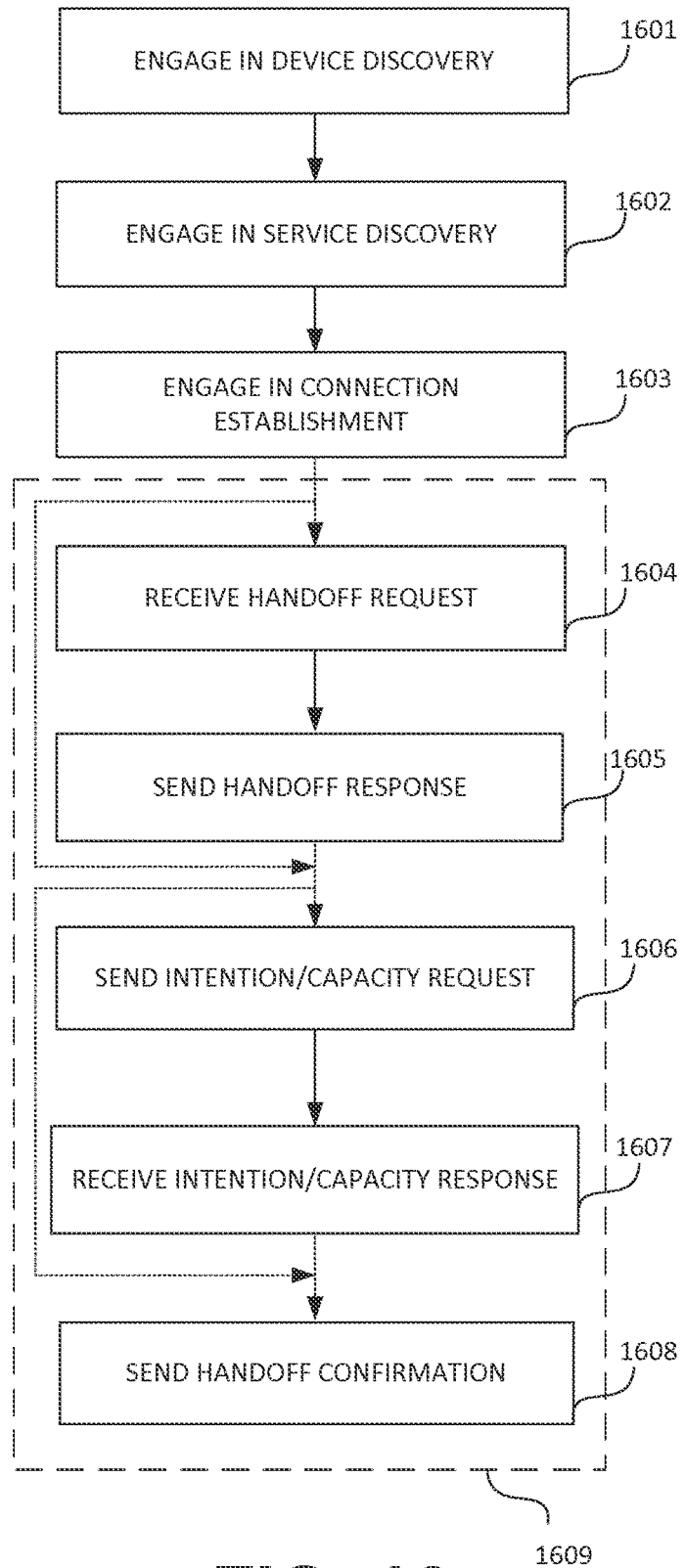
FIG. 16 is a flow diagram illustrating a method in an incumbent group owner in accordance with at least one embodiment.

FIG. 16 is a flow diagram illustrating a method in an incumbent group owner in accordance with at least one embodiment. In block 1601, the incumbent group owner engages in device discovery. From block 1601, the method continues to block 1602. In block 1602, the incumbent group owner engages in service discovery. From block 1602, the method continues to block 1603. In block 1603, the incumbent group owner engages in connection establishment. From block 1603, the method continues to subprocess 1609, which comprises blocks 1604, 1605, 1606, 1607, and 1608. Specifically, the method continues from block 1603 to block 1604. In block 1604, the incumbent group owner receives a handoff request. From block 1604, the method continues to block 1605. In block 1605, the incumbent group owner sends a handoff response. The handoff response comprises a status code. The status code may indicate unconditional acceptance of the handoff request, rejection of the handoff request, or conditional acceptance of the handoff request. The method may be performed differently as a function of a value of the status code. As an example, if the status code indicates conditional acceptance of the handoff request, the method may continue from block 1605 to block 1606. In block 1606, the incumbent group owner sends an intention/capacity request. From block 1606, the method continues to block 1607. In block 1607, the incumbent group owner receives an intention/capacity response. From block 1607, the method continues to block 1608. In block 1608, the incumbent group owner sends a handoff confirmation. As another example, if the status code indicates unconditional acceptance of the handoff request, the method may continue from block 1605 to block 1608. In block 1608, the incumbent group owner sends a handoff confirmation. As yet another example, if the status code indicates rejection of the handoff request, the method need not continue to blocks 1606, 1607, or 1608, as the proposed handoff has been declined and the rejection of the handoff request has been communicated by the sending of the handoff response in block 1605, so no further communication is needed with respect to the declined handoff. Accordingly, as an example, blocks 1606 and 1607 may be performed if the incumbent group owner checks other interested prospective group owner devices, and block 1608 may be performed if the incumbent group owner decides upon a new group owner from among at least one prospective group owners.

In accordance with at least one embodiment, blocks 1604 and 1605 need not be performed. For example, if the incumbent group owner intends to relinquish its role as group owner, the incumbent group owner may transmit an intention/capacity request in block 1606 as a way of broadcasting an intent to relinquish group ownership. Upon receiving the intention/capacity request, a prospective group owner may respond with an intention/capacity response in block 1607, which may include a group ownership suitability indicator for the prospective wireless device. As an example, more than one device may transmit an intention/capacity response in block 1607, with each responding device including its own group ownership suitability indicator in its intention/capacity response. The group ownership suitability indicator is received from the prospective group owner in response to the incumbent group owner broadcasting an intent to relinquish group ownership. In accordance with at least one embodiment, the incumbent group owner is a wireless device, and the prospective group owner is a wireless device. In response to receipt of one or more intention/capacity responses from one or more prospective group owners in block 1607, the incumbent group owner determines a new group owner (or decides to retain its group ownership) based on calculating locally a group owner based on the received intention/capacity responses.

The incumbent group owner then propagates information about the new group owner by broadcasting a handoff confirmation in block 1608 to the devices in the network, including any devices from which the incumbent group owner received intention/capacity responses in block 1607 as prospective group owners.

In accordance with at least one embodiment, the method of FIG. 16 may comprise programming a value for a group ownership suitability indicator in a wireless device as part of a manufacture of the wireless device. In accordance with at least one embodiment, the method of FIG. 16 may comprise dynamically modifying a value for a group ownership suitability indicator of a wireless device in response to a changed condition of the wireless device. For example, a value for a group ownership suitability indicator may be programmed in a device by the device's manufacturer in accordance with capabilities of the device. As an example, the value for the group ownership suitability indicator may be derived, at least in part, from the device's media access control (MAC) address. As an example, the value for the group ownership suitability indicator may be based, at least in part, on whether the device can transmit. As an example, the value for the group ownership suitability indicator may be based, at least in part, on the device's timing characteristics, for example, its beacon timing interval (BTI) and/or the range of BTIs of devices with which it may interact that it can accommodate. As an example, the value for the group ownership suitability indicator may be based, at least in part, on the device's ability or inability to provide resources to one or more clients. As an example, the value for the group ownership suitability indicator may be based, at least in part, on the device's ability or inability to provide a cross-connection to at least one other network. As an example, the value for the group ownership suitability indicator may be based, at least in part, on the device's ability or inability to support beamforming among multiple clients. As another example, the value for the group ownership suitability indicator may be based, at least in part, on a type of power source powering the device. As another example, the value for the group ownership suitability indicator may be based, at least in part, on an amount of battery power remaining for the device. As another example, the value for the group ownership suitability indicator may be based, at least in part, on an application priority, wherein an application of a higher priority may have more weight in determining a group owner than an application of a lower priority. As another example, the value for the group ownership suitability indicator may be based, at least in part, on an application necessity, wherein an application may require that the device on which it is executing be a group owner. As another example, the value for the group ownership suitability indicator may be based, at least in part, on a processing capability of the device. As another example, the value for the group ownership suitability indicator may be based, at least in part on a memory capacity of the device. As another example, the value for the group ownership suitability indicator may be based, at least in part on a networking throughput capacity of the device. As another example, the value for the group ownership suitability indicator may be based, at least in part, on a likelihood of the second wireless device to remain stationary. Such abilities and/or inabilities and other criteria may provide a gauge of suitability of a device to serve as a group owner, and a group ownership suitability indicator may be derived from such abilities and/or inabilities and other criteria. A device's group ownership suitability indicator may be changed after manufacturing. As an example, a group ownership suitability indicator of a device may be dynamically modified in response to a changed condition of the device. As an example, a device's group ownership suitability indicator may be changed if the device is upgraded or downgraded and/or a new option is installed in the device or an existing option is removed from the device, thereby changing the device's capabilities. As another example, a device's group ownership suitability indicator may be changed according to a network management operation to reflect a desired change in an operational characteristic of a network. A value for the group ownership suitability indicator reflects a relative suitability of the device to serve as a group owner (e.g., a personal base station set (PBSS) control point (PCP)) in a group connected via wireless networking technology (e.g., a wireless personal area network (WPAN), and, as a more specific example, a 60 GHz peer-to-peer (P2P) WPAN).

Figure 17:
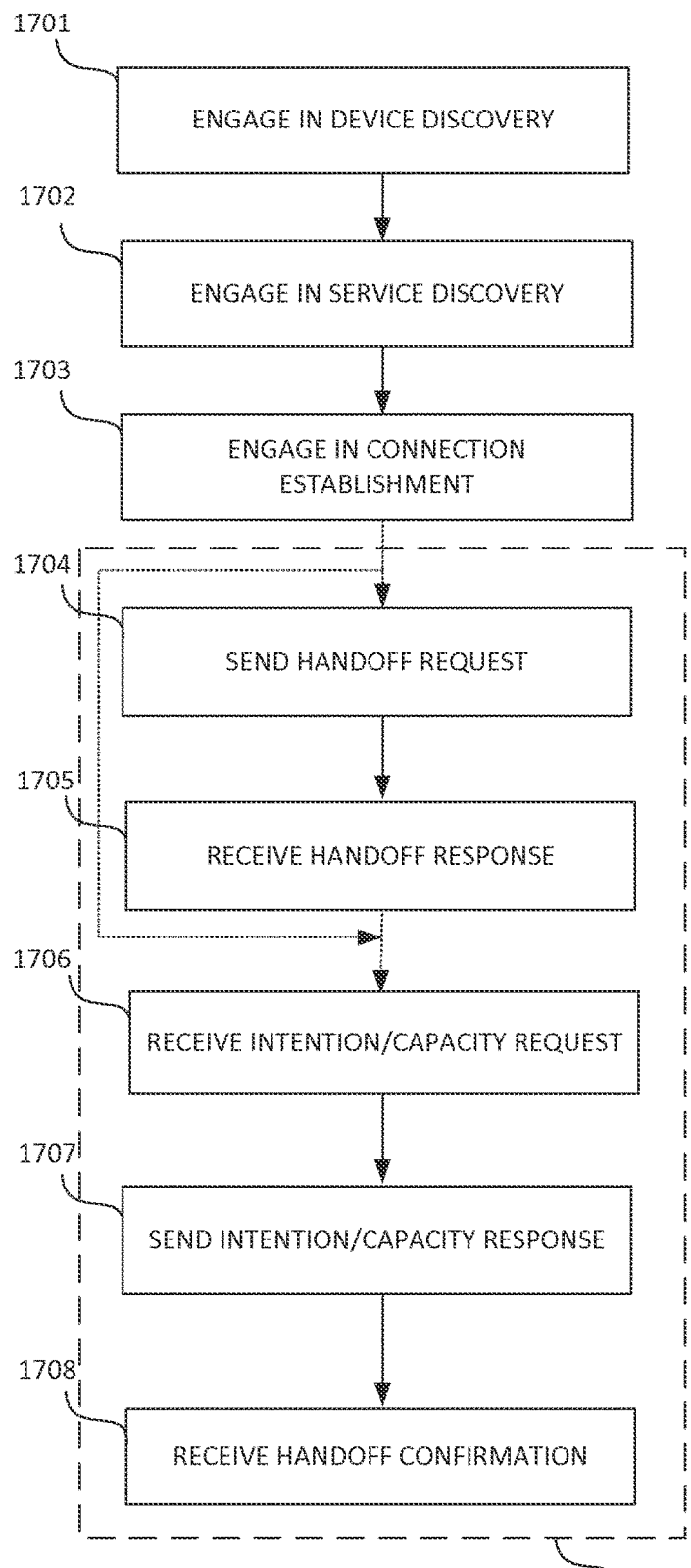
FIG. 17 is a flow diagram illustrating a method in a prospective group owner in accordance with at least one embodiment.

FIG. 17 is a flow diagram illustrating a method in a prospective group owner in accordance with at least one embodiment. In block 1701, the prospective group owner engages in device discovery. From block 1701, the method continues to block 1702. In block 1702, the prospective group owner engages in service discovery. From block 1702, the method continues to block 1703. In block 1703, the prospective group owner engages in connection establishment. From block 1703, the method continues to subprocess 1709, which comprises blocks 1704, 1705, 1706, 1707, and 1708. Specifically, the method continues from block 1703 to block 1704. In block 1704, the prospective group owner sends a handoff request. From block 1704, the method continues to block 1705. In block 1705, the prospective group owner receives a handoff response. From block 1705, the method continues to block 1706. In block 1706, the prospective group owner receives an intention/capacity request. From block 1706, the method continues to block 1707. In block 1707, the prospective group owner sends an intention/capacity response. From block 1707, the method continues to block 1708. In block 1708, the prospective group owner receives a handoff confirmation.

In accordance with at least one embodiment, blocks 1704 and 1705 need not be performed. For example, if the incumbent group owner intends to relinquish its role as group owner, the incumbent group owner may transmit an intention/capacity request as a way of broadcasting an intent to relinquish group ownership, and such an intention/capacity request may be received by the prospective group owner in block 1706. Upon receiving the intention/capacity request, a prospective group owner may respond by sending an intention/capacity response in block 1707, which may include a group ownership suitability indicator for the prospective wireless device. As an example, more than one device may transmit an intention/capacity response in block 1707, with each responding device including its own group ownership suitability indicator in its intention/capacity response. The incumbent group owner may receive the group ownership suitability indicator from the prospective group owner in response to the incumbent group owner broadcasting an intent to relinquish group ownership, for example, an intention/capacity request from the incumbent group owner. In accordance with at least one embodiment, the incumbent group owner is a wireless device, and the prospective group owner is a wireless device. In response to receipt of one or more intention/capacity responses from one or more prospective group owners in block 1707, the incumbent group owner determines a new group owner (or decides to retain its group ownership) based on calculating locally a group owner based on the received intention/capacity responses. The incumbent group owner then propagates information about the new group owner by broadcasting a handoff confirmation to the devices in the network, which is received by at least one prospective group owner in block 1708.

In accordance with at least one embodiment, the method of FIG. 17 may comprise programming the second value at the first wireless device as part of a manufacture of the first wireless device. In accordance with at least one embodiment, the method of FIG. 17 may comprise dynamically modifying the second value at the first wireless device in response to a changed condition of the first wireless device. For example, a value for a group ownership suitability indicator may be programmed in a device by the device's manufacturer in accordance with capabilities of the device. As an example, the value for the group ownership suitability indicator may be derived, at least in part, from the device's media access control (MAC) address. As an example, the value for the group ownership suitability indicator may be based, at least in part, on whether the device can transmit. As an example, the value for the group ownership suitability indicator may be based, at least in part, on the device's timing characteristics, for example, its beacon timing interval (BTI) and/or the range of BTIs of devices with which it may interact that it can accommodate. As an example, the value for the group ownership suitability indicator may be based, at least in part, on the device's ability or inability to provide resources to one or more clients. As an example, the value for the group ownership suitability indicator may be based, at least in part, on the device's ability or inability to provide a cross-connection to at least one other network. As an example, the value for the group ownership suitability indicator may be based, at least in part, on the device's ability or inability to support beamforming among multiple clients. As another example, the value for the group ownership suitability indicator may be based, at least in part, on a type of power source powering the device. As another example, the value for the group ownership suitability indicator may be based, at least in part, on an amount of battery power remaining for the device. As another example, the value for the group ownership suitability indicator may be based, at least in part, on an application priority, wherein an application of a higher priority may have more weight in determining a group owner than an application of a lower priority. As another example, the value for the group ownership suitability indicator may be based, at least in part, on an application necessity, wherein an application may require that the device on which it is executing be a group owner. As another example, the value for the group ownership suitability indicator may be based, at least in part, on a processing capability of the device. As another example, the value for the group ownership suitability indicator may be based, at least in part on a memory capacity of the device. As another example, the value for the group ownership suitability indicator may be based, at least in part on a networking throughput capacity of the device. As another example, the value for the group ownership suitability indicator may be based, at least in part, on a likelihood of the second wireless device to remain stationary. Such abilities and/or inabilities and other criteria may provide a gauge of suitability of a device to serve as a group owner, and a group ownership suitability indicator may be derived from such abilities and/or inabilities and other criteria. A device's group ownership suitability indicator may be changed after manufacturing. As an example, a group ownership suitability indicator of a device may be dynamically modified in response to a changed condition of the device. As an example, a device's group ownership suitability indicator may be changed if the device is upgraded or downgraded and/or a new option is installed in the device or an existing option is removed from the device, thereby changing the device's capabilities. As another example, a device's group ownership suitability indicator may be changed according to a network management operation to reflect a desired change in an operational characteristic of a network. A value for the group ownership suitability indicator reflects a relative suitability of the device to serve as a group owner (e.g., a personal base station set (PBSS) control point (PCP)) in a group connected via wireless networking technology (e.g., a wireless personal area network (WPAN), and, as a more specific example, a 60 GHz peer-to-peer (P2P) WPAN).

In this document, relational terms such as "first" and "second", and the like, may be used solely to distinguish one entity or action from another entity or action without necessarily requiring or implying any actual relationship or order between such entities or actions or any actual relationship or order between such entities and claimed elements. The term "another", as used herein, is defined as at least a second or more. The terms "including", "having", or any variation thereof, as used herein, are defined as comprising.

Other embodiments, uses, and advantages of the disclosure will be apparent to those skilled in the art from consideration of the specification and practice of the disclosure disclosed herein. The specification and drawings should be considered as examples only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, in a first wireless device acting as an incumbent group owner in a wireless peer-to-peer network, comprising:
    receiving a first group ownership suitability indicator from a second wireless device acting as a prospective group owner for the wireless peer-to-peer network, the first group ownership suitability indicator indicative of a suitability of the second wireless device to serve as a group owner and representative of a relative suitability of the second wireless device for group ownership on the basis of at least one of: an ability to support beamforming among multiple wireless devices; a type of power source; and a likelihood of the second wireless device remaining stationary; and negotiating group ownership with the second wireless device based on the first group ownership suitability indicator.

2. The method of claim 1, further comprising:

comparing the first group ownership suitability indicator to a second group ownership suitability indicator indicative of a suitability of the first wireless device to serve as the group owner.

3. The method of claim 2, further comprising:

transferring group ownership to the second wireless device in response to determining the second wireless device to be more suitable to be the group owner than first wireless device responsive to comparing the first group ownership suitability indicator to the second group ownership suitability indicator.

4. The method of claim 2, further comprising:

retaining group ownership at the first wireless device in response to determining the first wireless device to be more suitable to be the group owner than second wireless device responsive to comparing the first group ownership suitability indicator to the second group ownership suitability indicator.

5. The method of claim 2, wherein:

the first group ownership suitability indicator is a first value and the second group ownership suitability indicator is a second value; and comparing the first group ownership suitability indicator to the second group ownership suitability indicator comprises determining which of the first wireless device and the second wireless device is better suited to act as the group owner based on a comparison of the first value and the second value.

6. The method of claim 5, further comprising:

programming the second value at the first wireless device as part of a manufacture of the first wireless device.

7. The method of claim 5, further comprising:

dynamically modifying the second value at the first wireless device in response to a changed condition of the first wireless device.

8. The method of claim 7, wherein the changed condition comprises a change in at least one of: an ability to support beamforming among multiple wireless devices; a type of power source; an amount of battery power remaining; and a likelihood of the second wireless device remaining stationary.

9. The method of claim 3, wherein:

negotiating group ownership with the second wireless device comprises:

receiving a handoff request from the second wireless device; and sending a handoff response to the second wireless device; and transferring the group ownership to the second wireless device comprises sending a handoff confirmation to the second wireless device.

10. The method of claim 1, further comprising:

broadcasting, from the first wireless device, an intent to relinquish group ownership; and wherein the first group ownership suitability indicator is transmitted by the second wireless device in response to the broadcast intent to relinquish group ownership.

11. A first wireless device comprising:

a wireless transceiver;

a processor coupled to the wireless transceiver; and a memory coupled to the processor, the memory configured to store instructions executable by the processor to manipulate the processor to:

configure the first wireless device to act as an incumbent group owner in a wireless peer-to-peer network;

receive a first group ownership suitability indicator from a second wireless device acting as a prospective group owner for the wireless peer-to-peer network, the first group ownership suitability indicator indicative of a suitability of the second wireless device to serve as a group owner and representative of a relative suitability of the second wireless device for group ownership on the basis of at least one of: an ability to support beamforming among multiple wireless devices; a type of power source; and a likelihood of the second wireless device remaining stationary; and negotiate group ownership with the second wireless device based on the first group ownership suitability indicator.

12. The first wireless device of claim 11, wherein the instructions further are to manipulate the processor to:

compare the first group ownership suitability indicator to a second group ownership suitability indicator indicative of a suitability of the first wireless device to serve as the group owner.

13. The first wireless device of claim 12, wherein the instructions further are to manipulate the processor to:

transfer group ownership to the second wireless device in response to determining the second wireless device to be more suitable to be the group owner than first wireless device responsive to comparing the first group ownership suitability indicator to the second group ownership suitability indicator.

14. The first wireless device of claim 12, wherein the instructions further are to manipulate the processor to:

retain group ownership at the first wireless device in response to determining the first wireless device to be more suitable to be the group owner than second wireless device responsive to comparing the first group ownership suitability indicator to the second group ownership suitability indicator.

15. The first wireless device of claim 12, wherein:

the first group ownership suitability indicator is a first value and the second group ownership suitability indicator is a second value; and the instructions to manipulate the processor to compare the first group ownership suitability indicator to the second group ownership suitability indicator comprise instructions to manipulate the processor to determine which of the first wireless device and the second wireless device is better suited to act as the group owner based on a comparison of the first value and the second value.

16. The first wireless device of claim 15, wherein the instructions further are to manipulate the processor to:

program the second value at the first wireless device as part of a manufacture of the first wireless device.

17. The first wireless device of claim 15, wherein the instructions further are to manipulate the processor to:

dynamically modify the second value at the first wireless device in response to a changed condition of the first wireless device.

18. The first wireless device of claim 17, wherein the changed condition comprises a change in at least one of: an ability to support beamforming among multiple wireless devices; a type of power source; an amount of battery power remaining; and a likelihood of the second wireless device remaining stationary.

19. The first wireless device of claim 13, wherein:
the instructions to manipulate the processor to negotiate group ownership with the second wireless device comprise instructions to manipulate the processor to:
  receive a handoff request from the second wireless device; and
  send a handoff response to the second wireless device; and
the instructions to manipulate the processor to transfer the group ownership to the second wireless device comprise instructions to manipulate the processor to send a handoff confirmation to the second wireless device.

20. The first wireless device of claim 11, wherein:
the instructions further comprise instructions to manipulate the processor to broadcast an intent to relinquish group ownership; and
wherein the first group ownership suitability indicator is transmitted by the second wireless device in response to the broadcast intent to relinquish group ownership.

* * * * *